Figure 1:
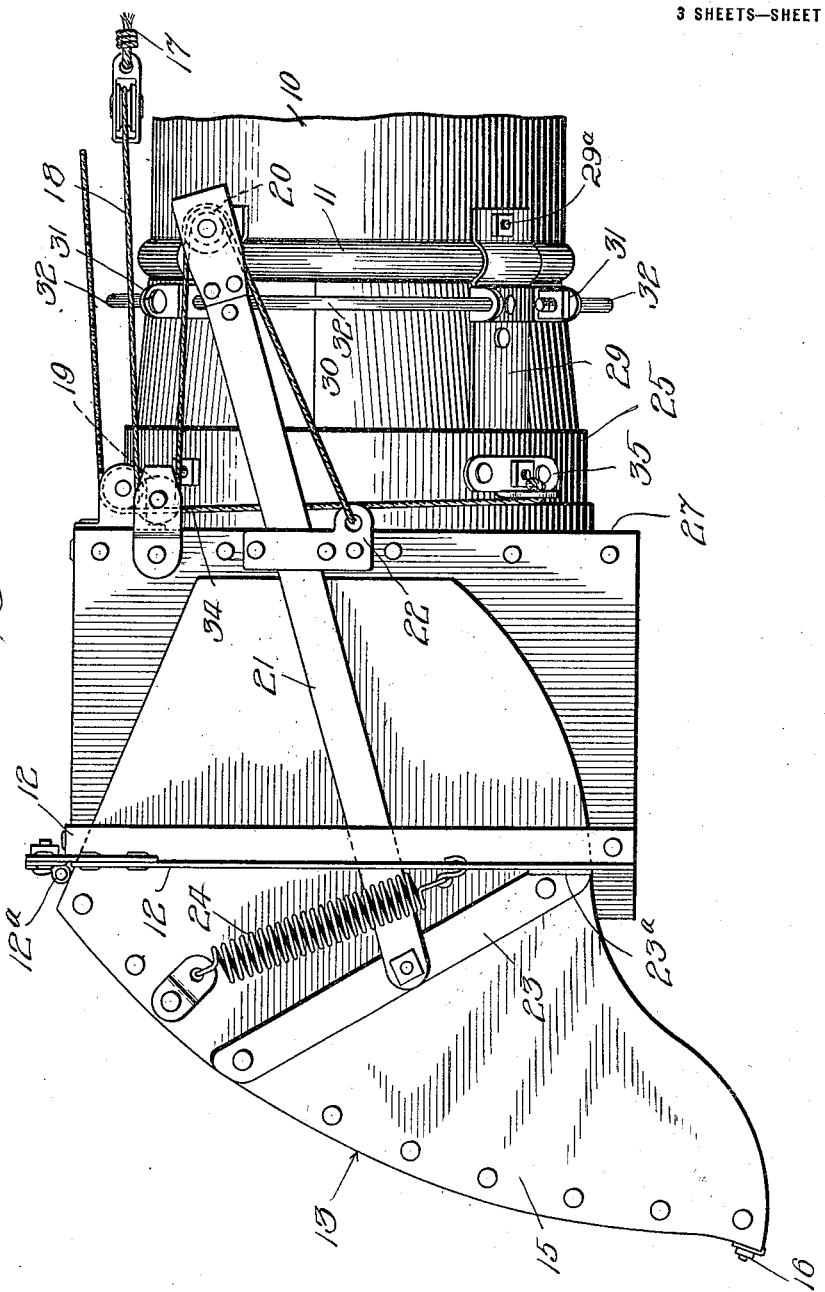

G. B. NELSON.
HOOD FOR PNEUMATIC STACKERS.
APPLICATION FILED JAN. 28, 1914.

1,201,333.

Patented Oct. 17, 1916.
3 SHEETS—SHEET 1.

Witnesses:
Harry S. Gaither
M. E. Martin

Inventor:
George B. Nelson
by Wallace R. Lane
Atty

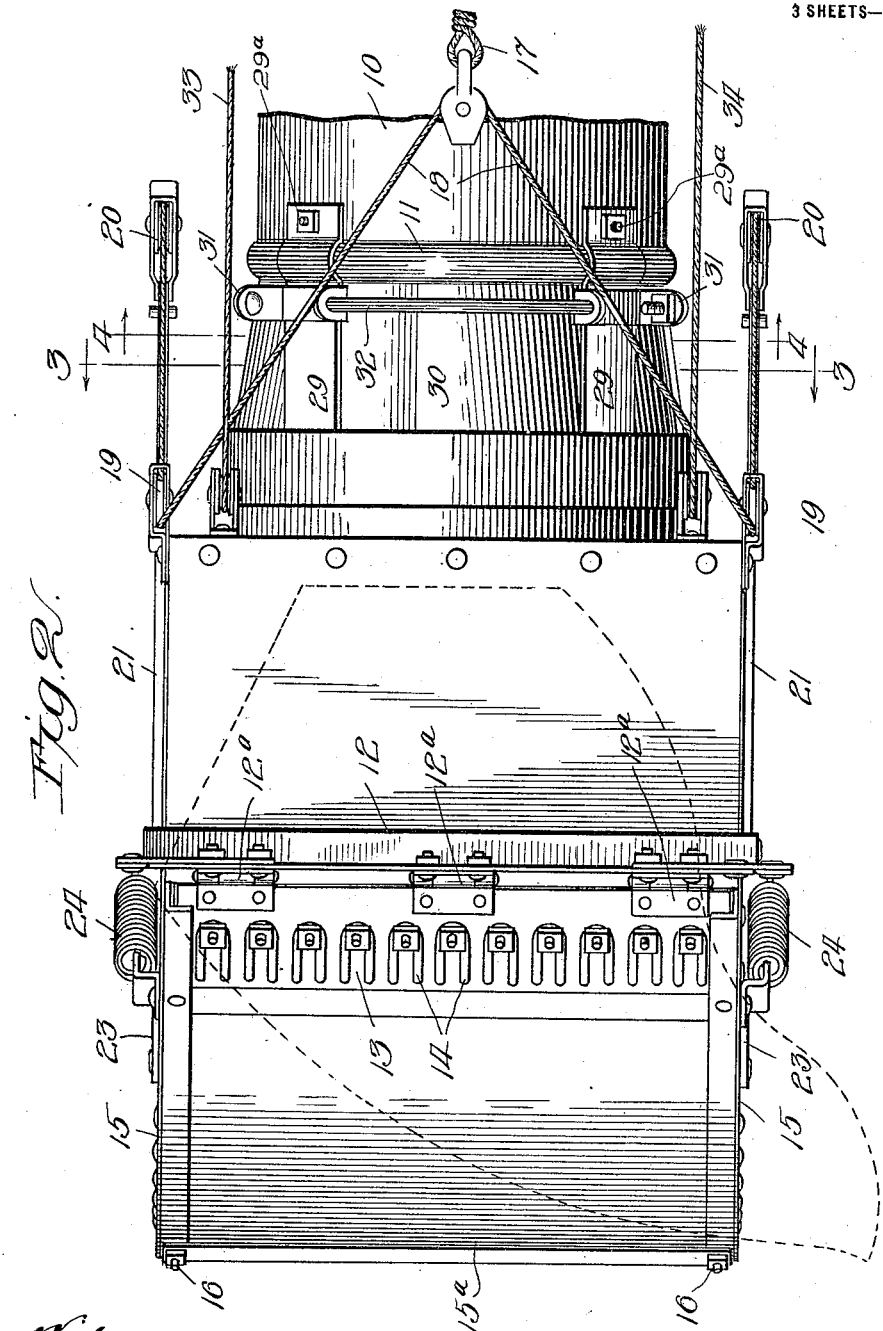

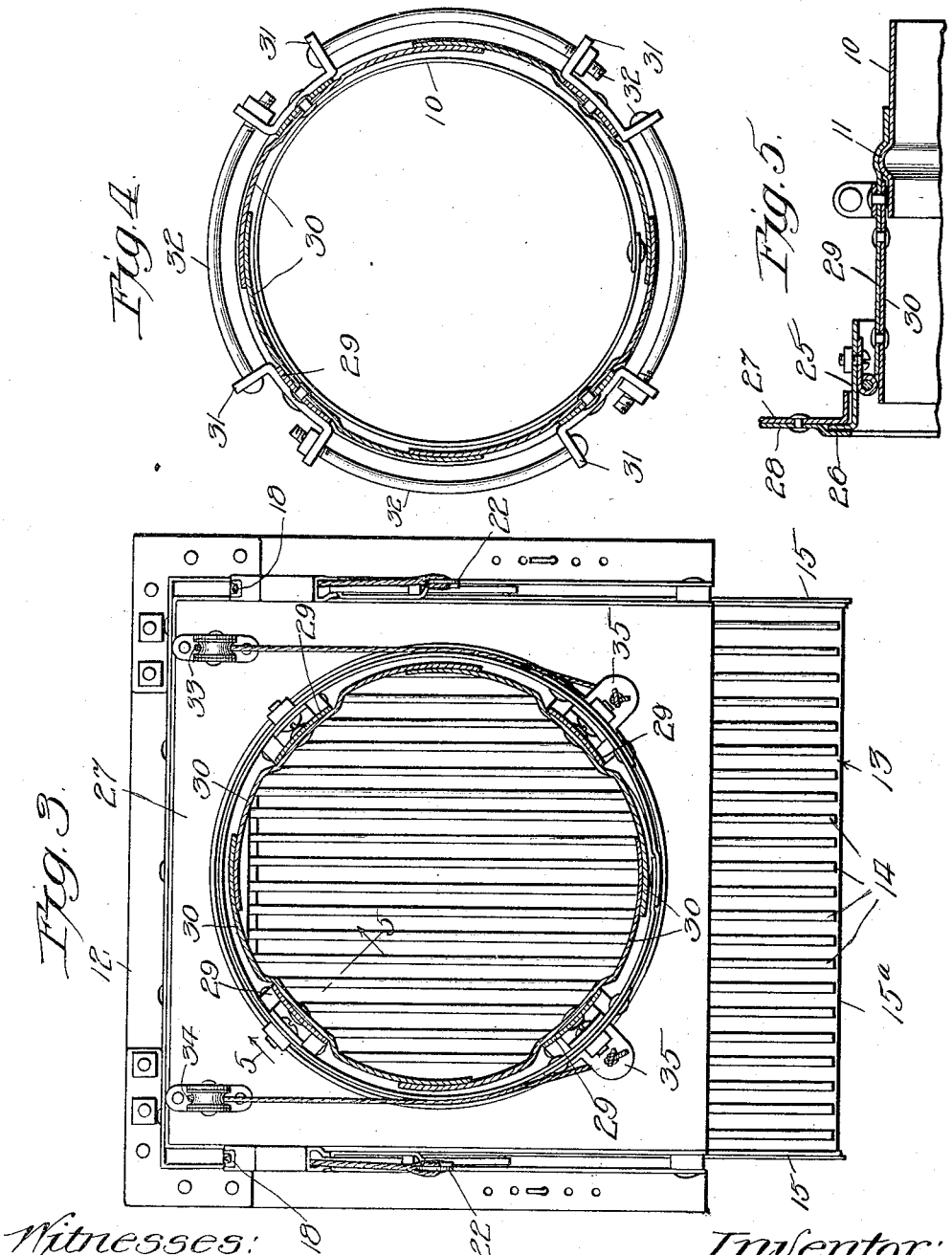

UNITED STATES PATENT OFFICE.

GEORGE B. NELSON, OF REDFIELD, IOWA.

HOOD FOR PNEUMATIC STACKERS.

1,201,333.  Specification of Letters Patent.  Patented Oct. 17, 1916.

Application filed January 28, 1914. Serial No. 814,869.

*To all whom it may concern:*

Be it known that I, GEORGE B. NELSON, a citizen of the United States, residing at Redfield, in the county of Dallas and State of Iowa, have invented a new and useful Improvement in Hoods for Pneumatic Stackers, of which the following is a specification of one embodiment thereof.

My present invention relates to hoods for pneumatic stackers such as is disclosed in my pending application Ser. No. 766,971, filed May 12, 1913, and the object of the present invention is to provide improved means for easily and quickly attaching and detaching the hood to the conveyer tube, also to provide an improved means for adjusting the hood to different sized conveyer tubes.

A further object is to provide improved means for easily revolving the hood on the stacker.

A further object is to provide an improved deflector at the discharge end of the hood and means for operating the same.

The above features and other capabilities and advantages of the invention will become apparent from the detailed description of the accompanying drawings showing one embodiment of the invention wherein—

Figure 1 is a side elevational view showing a hood revolubly mounted on a conveyer tube. Fig. 2 is a top plan view of the same and showing in dotted lines the position of the hood at right angles to its normal position. Fig. 3 is a cross section taken on the line 3—3 of Fig. 2 and looking in the direction of the arrows. Fig. 4 is a cross section taken on the line 4—4 of Fig. 2 and looking in the direction indicated by the arrows. Fig. 5 is a detailed sectional view taken on the line 5—5 of Fig. 3 showing the connection between the hood and conveyer tube.

In the construction shown in the accompanying drawings, the conveyer tube 10 is illustrated having a bead 11 around its periphery near its outlet end, to which end is secured the hood, by means presently to be described. The hood comprises a rectangular body portion (except that it has no bottom) having an end provided with a central opening.

Rigidly secured to the outer end of the body portion of the hood, is a frame 12 constructed of angle irons which extend across the top and down the sides thereof to the top piece of which is hingedly mounted, by any suitable means such as the hinge 12ª, a deflector 13, which deflector comprises a series of curved tines 14, and two side members 15, by means of which the chaff and dust and other small particles are blown between the tines while the straw may be deflected downwardly to the stack. When the hood is used on a tube conveying straw into the barn or other inclosure, it is desirable to have a covering over the tines to prevent the chaff or dust from being blown outwardly throughout the inclosure, therefore, I provide a curved shield 15ª which is slidably and detachably mounted between the sides 14 and on the outside of the tines 13 which shield can be withdrawn by simply removing the bolts 16 at the lower end of the deflector.

For swinging the deflector about its hinges 12ª for the purpose of deflecting the material at different angles from the hood, I provide means operable from the machine to which the conveyer tube is attached, which comprises a cable 17 extending back to the machine and having at its outer end a suitable sheave, over which passes a suitable cable having two branches 18 and 18, which branches pass backwardly and outwardly over sheaves 19 thence over the sheaves 20 in the end of the arms 21, thence to the lugs 22 to which the ends are secured.

The arms 21 are slidably mounted in suitable keepers secured to the sides of the hood and are pivotally connected at their outer end by any suitable means, such as the bolt shown, to braces 23—which braces are rigidly secured to the sides 15 of the deflector and are provided at their lower ends with an outwardly extending flange 23ª designed to engage the side pieces of the frame 12 to limit the inward and downward movement of the deflector. It will be seen that by pulling the cable leading to the machine, the deflector as a whole including its side members, may be swung about the hinges 12ª by means of which the blast may be deflected at various angles from the hood. By positioning the arm 21 so that its inner end is substantially even with the lower side of the sheaves 19, the upper side of which is substantially even with the upper surface of the conveyer tube, the deflector can be efficiently and easily raised or swung about the hinges 12ᵃ.

For automatically returning the deflector to its normal position, I provide coil springs 24 which are secured at one end to the side member 15 of the deflector near the upper edge thereof and are detachably connected at their opposite ends to suitable openings in the side pieces of the frame 12, which side pieces are provided with a series of openings in alinement so that the springs 24 may be adjusted to the proper tension.

To revolubly mount the hood on a conveyer tube, a collar member is inserted within the opening in the end 27 of the hood, which collar member is of such construction that a standard size hood, without in any way being changed, may be fitted to the various sizes of the conveyer tubes. The collar comprises a tubular member 25 having its outer end bent outwardly to form a radially extending flange 26, which flange travels between the end 27 of the body of the hood and a series of flange plates 28 secured on the inside of the end 27 of the hood near the opening therein, one of which plates is shown in Fig. 5. Hingedly mounted on the inner side of the tubular member 25 are a series of strips 29, which are provided near their free ends with a bead adapted to fit over and engage the bead 11 on the conveyer tube 10. Secured to each strip, intermediate its ends, is a plate 30 which extends from the bead in said strip forward to near the inner edge of the said tubular member 25. These plates 30 are of sufficient extent so that they will project one over another to form a complete annular collar.

To bind the strips 29 onto the conveyer tube, each strip has rigidly secured thereto, a lug 31, provided with openings in alinement to receive suitable tie rods 32, one end of each of said lugs being connected to the next succeeding lug by means of one of said tie rods, while the opposite end of said lug is connected to the preceding lug as best shown in Fig. 4. A nut is secured on each of these rods whereby the strips 29 may be tightly bound on the end of the conveyer tube by simply adjusting the nuts on said rods. With this arrangement, it is obvious that the strips may be adjusted to fit various sized tubes. By having said tie rods arranged in alinement, all torque or twisting action, which causes the collar 25 to bind in its connection with the hood, is eliminated, thus permitting the tubular member 25 to revolve freely in its connection with the body portion of the hood. For additionally securing the strips 29 to the conveyer tube, the radially extending ends of said strips are provided with an opening to receive a suitable bolt 29ᵃ, which bolt passes through an opening in the conveyer tube and thence through the opening in said strips and is provided on its outer end with an adjustable nut, by means of which the parts may be rigidly secured together.

To revolve the hood, a pair of ropes or cables are provided, one 33 going to the right and the other 34 going to the left of the conveyer tube, each passing over a sheave or pulley mounted on the inner end 27 of the hood near the outer and upper edge thereof, thence downwardly where they are connected with lugs 35—35 secured by any suitable means to the tubular member 25. As the tubular member 25 is stationary when mounted on a conveyer tube, it will be seen that by pulling on the cable 34, the left side of the hood will be lowered and the right side raised, and by pulling on the cable 33, the operation is just reversed. By mounting the sheaves and pulleys near the outer and upper edge of the hood 27, substantially a straight pull is afforded to the lugs 35, thus eliminating any binding friction, and lessening the energy for revolving the hood.

What I claim as new and desire to secure by Letters Patent is:

1. In a device of the class described, a collar, a hood revolubly mounted on said collar, strips rigidly connected to said collar and adapted to be connected with a conveyer tube and adjustable means for securing said strips to said conveyer tube whereby the binding action between said collar and said hood is eliminated.

2. In combination with a discharge tube of a pneumatic stacker, a collar, a hood revolubly mounted on said collar, flexible strips connected with said collar and adapted to be connected with said discharge tube, and adjustable means for securing said strips to said discharge tube, said means comprising a lug secured to each strip provided with openings in alinement and adjustable tie rods passing through said openings and connecting said lugs one with another.

3. In a device of the class described, a collar, a hood revolubly mounted on said collar and fastening means hingedly connected with said collar whereby said fastening means is adapted to be connected to and receive conveyer tubes differing in diameter.

4. In combination with a discharge tube of a pneumatic stacker, a collar, a hood revolubly mounted on said collar, strips hingedly connected at one end to said collar and adapted to be connected at the opposite end to said discharge tube, plates overlapping one another and secured to said strips and adjustable means for securing said strips to said discharge tube.

5. In combination with a discharge tube of a pneumatic stacker provided at its outlet end with a bead, a collar, a hood revolubly mounted on said collar, strips hingedly connected to said collar and provided near their outer ends with a groove adapted to fit over the bead on said discharge tube, plates overlapping one another and secured to said strips, said plates being positioned between the bead on said discharge tube and the outer end of said collar, and adjustable means for securing said pieces to said discharge tube.

6. In combination with a discharge tube of a pneumatic stacker, a collar, strips attached to said collar and adapted to be connected with said discharge tube, adjustable means for securing said strips on said discharge tube, said means comprising a lug provided with openings in alinement secured to each strip and adjustable tie rods passing through said openings and connecting one lug with another.

7. In combination with a discharge tube of a pneumatic stacker, a hood connected with said discharge tube, a deflector hingedly mounted on said hood, said deflector consisting of a series of curved tines and two side members, said tines and side members being adapted to swing together about said hinges, means for swinging said deflector about said hinges and means for limiting the downward and inward movement of said deflector comprising a flange on one of the side members.

8. In combination with a discharge tube of a pneumatic stacker, a hood connected with said discharge tube, a deflector hingedly mounted on said hood, said deflector consisting of a series of curved tines and two side members, said tines and side members being adapted to swing together about said hinges, and a detachable and removable adjustable shield adapted to fit over and completely cover said tines.

In witness whereof, I hereunto subscribe my name to this specification in the presence of two witnesses.

GEORGE B. NELSON.

Witnesses:
 JOE SPILLERS,
 F. R. COMBS.

Copies of this patent may be obtained for five cents each, by addressing the "Commissioner of Patents, Washington, D. C."